US010958727B2

(12) United States Patent
Guendert et al.

(10) Patent No.: US 10,958,727 B2
(45) Date of Patent: Mar. 23, 2021

(54) FACILITATING PRECISION TIME PROTOCOL USE IN A COORDINATED TIMING NETWORK

(71) Applicant: INTERNATIONAL BUSINESS MACHINES CORPORATION, Armonk, NY (US)

(72) Inventors: Stephen R. Guendert, Poughkeepsie, NY (US); John S. Houston, Hopewell Junction, NY (US); Donald Crabtree, Port Ewen, NY (US); Stephen P. Cherniak, Bainbridge, NY (US); Paul Wojciak, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 16/269,899

(22) Filed: Feb. 7, 2019

(65) Prior Publication Data
US 2020/0259897 A1    Aug. 13, 2020

(51) Int. Cl.
*G06F 15/16* (2006.01)
*H04L 29/08* (2006.01)
(Continued)

(52) U.S. Cl.
CPC .......... *H04L 67/1095* (2013.01); *H04L 41/24* (2013.01); *H04L 69/18* (2013.01)

(58) Field of Classification Search
CPC ...... H04L 67/1095; H04L 69/18; H04L 41/24
See application file for complete search history.

(56) References Cited

U.S. PATENT DOCUMENTS 5,548,796 A    8/1996   Ketchum
7,394,802 B2 *   7/2008   Jun ........................ H04W 56/00
                                                                                                                         370/350
(Continued)

FOREIGN PATENT DOCUMENTS

CN        203313199 U    11/2013
CN        103731252 A     4/2014
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Moustafa M Meky
*Assistant Examiner* — Thorne E Waugh
(74) *Attorney, Agent, or Firm* — Steven Chiu, Esq.; Kevin P. Radigan, Esq.; Heslin Rothenberg Farley & Mesiti P.C.

(57) ABSTRACT

A time server of a server time protocol (STP) facility of a coordinated timing network (CTN) receives a primary-reference-time (PRT) update, with the primary-reference-time update having been determined with reference to a time source, which includes a precision-time-protocol (PTP) source. The time server sets a primary reference time correction steering rate for the coordinated timing network based on receiving the primary-reference-time update, and broadcasts to one or more other servers of the coordinated timing network a PRT-correction-steering information block (PCSIB). The PRT-correction-steering information block includes a precision-time-protocol identifier for the time source used in determining the primary-reference-time update, and the primary-reference-time correction steering rate set by the time server.

20 Claims, 13 Drawing Sheets

(51) Int. Cl.
*H04L 12/24* (2006.01)
*H04L 29/06* (2006.01)

(56) References Cited

U.S. PATENT DOCUMENTS

| | | | | |
|---|---|---|---|---|
| 7,433,362 | B2* | 10/2008 | Mallya | H04J 3/12 370/219 |
| 7,454,648 | B2* | 11/2008 | Dahlen | G04G 7/00 713/500 |
| 7,539,777 | B1 | 5/2009 | Aitken | |
| 7,716,662 | B2* | 5/2010 | Seiden | H04N 5/4401 717/173 |
| 7,762,470 | B2* | 7/2010 | Finn | H04H 60/74 235/492 |
| 7,779,109 | B2* | 8/2010 | Carlson | H04J 3/0641 709/223 |
| 7,783,736 | B2 | 8/2010 | Carlson et al. | |
| 7,783,913 | B2* | 8/2010 | Carlson | H04J 3/0641 714/4.1 |
| 7,958,384 | B2 | 6/2011 | Carlson et al. | |
| 8,738,792 | B2* | 5/2014 | Carlson | H04L 67/00 709/230 |
| 9,164,699 | B2 | 10/2015 | Carlson et al. | |
| 9,252,902 | B2 | 2/2016 | Chapman et al. | |
| 9,723,060 | B2 | 8/2017 | Almadi et al. | |
| 9,871,648 | B2 | 1/2018 | Lanzone et al. | |
| 9,934,113 | B2 | 4/2018 | Cherniak et al. | |
| 10,222,823 | B2* | 3/2019 | Larson | G06F 9/4401 |
| 10,623,173 | B1 | 4/2020 | Geng et al. | |
| 2006/0103535 | A1* | 5/2006 | Pahlaven | G06K 7/10306 340/572.1 |
| 2007/0008993 | A1 | 1/2007 | Cha et al. | |
| 2008/0120129 | A1* | 5/2008 | Seubert | G06Q 10/10 705/35 |
| 2008/0183895 | A1* | 7/2008 | Carlson | G06F 1/14 709/248 |
| 2008/0184060 | A1 | 7/2008 | Carlson et al. | |
| 2009/0257456 | A1 | 10/2009 | Carlson et al. | |
| 2009/0259881 | A1 | 10/2009 | Carlson et al. | |
| 2010/0100761 | A1 | 4/2010 | Carlson et al. | |
| 2010/0100762 | A1 | 4/2010 | Carlson et al. | |
| 2011/0153869 | A1 | 6/2011 | Bryant et al. | |
| 2012/0311168 | A1 | 12/2012 | Dougan et al. | |
| 2014/0281037 | A1 | 9/2014 | Spada et al. | |
| 2016/0013876 | A1 | 1/2016 | Zhang et al. | |
| 2018/0131457 | A1 | 5/2018 | Michael et al. | |
| 2018/0205476 | A1 | 7/2018 | Wang et al. | |
| 2019/0042525 | A1 | 2/2019 | McElrath et al. | |
| 2019/0272185 | A1 | 9/2019 | Mukraj et al. | |

FOREIGN PATENT DOCUMENTS

| | | |
|---|---|---|
| CN | 104363530 A | 2/2015 |
| CN | 105429725 A | 3/2016 |
| WO | WO2017101484 A1 | 6/2017 |

OTHER PUBLICATIONS

International Business Machines Corporation (IBM), "Power ISA™ Version 2.07B," Apr. 9, 2015 (pp. 1-1527).
IBM Publication, "z/Architecture Principles of Operation," IBM® Publication No. SA22-7832-11, 12th Edition, Sep. 2017 (pp. 1-1902).
Anonymous, "Public Transport in Oz", Website on IEEE 1588 Precision Time Protocol (PTP). Retrieved from https://www.eecis.udel.edu/~mills/ptp.html.
Guendert et al., "Setting Primary Reference Time of Server Time Protocol Facility of a Coordinated Timing Network to a Precision-Time-Protocol Source", U.S. Appl. No. 16/269,888, filed Feb. 7, 2019 (61 pages).
Guendert et al., "List of IBM Patents and/or Patent Applications Treated as Related", U.S. Appl. No. 16/269,899, filed Feb. 7, 2019, dated Feb. 7, 2019 (2 pages).

* cited by examiner

RECEIVE AT A TIME SERVER OF A SERVER TIME PROTOCOL (STP) FACILITY OF A COORDINATED TIMING NETWORK (CTN), A PRIMARY-REFERENCE-TIME (PRT) UPDATE, THE PRIMARY-REFERENCE-TIME UPDATE HAVING BEEN DETERMINED WITH REFERENCE TO A TIME SOURCE, THE TIME SOURCE INCLUDING A PRECISION-TIME-PROTOCOL (PTP) TIME SOURCE ~1000

SET BY THE TIME SERVER A PRIMARY-REFERENCE-TIME CORRECTION STEERING RATE FOR THE COORDINATED TIMING NETWORK BASED ON RECEIVING THE PRIMARY-REFERENCE-TIME UPDATE ~1002

BROADCAST BY THE TIME SERVER TO ONE OR MORE OTHER SERVERS OF THE COORDINATED TIMING NETWORK A PRT CORRECTION STEERING INFORMATION BLOCK (PCSIB), THE PRT CORRECTION STEERING INFORMATION BLOCK INCLUDING A PRECISION TIME-PROTOCOL SOURCE IDENTIFIER FOR THE TIME SOURCE USED IN DETERMINING THE PRIMARY-REFERENCE-TIME UPDATE, AND THE PRIMARY-REFERENCE-TIME CORRECTION STEERING RATE SET BY THE TIME SERVER ~1004

THE TIME SOURCE IS ONE EXTERNAL TIME SOURCE OF MULTIPLE EXTERNAL TIME SOURCES SUPPORTED FOR THE SERVER TIME PROTOCOL FACILITY, AND THE COORDINATED TIMING NETWORK IS AN STP-ONLY CTN ~1006

ANOTHER TIME SOURCE OF THE MULTIPLE EXTERNAL TIME SOURCES INCLUDES A NETWORK TIMING PROTOCOL (NTP) TIME SOURCE ~1008

FIG. 10A

- THE PRIMARY-REFERENCE-TIME (PRT) UPDATE IS RECEIVED IN A COMMAND, THE COMMAND BEING RECEIVED AT THE TIME SERVER FROM AT LEAST ONE OF A HARDWARE MANAGEMENT CONSOLE OR A SUPPORT ELEMENT COUPLED TO THE COORDINATED TIMING NETWORK ~1010

- FURTHER RECEIVE, BY THE TIME SERVER, A PRIMARY-REFERENCE-TIME SOURCE IDENTIFIER WITH THE PRIMARY-REFERENCE-TIME (PRT) UPDATE, AND THE BROADCASTING INCLUDES BROADCASTING, BY THE TIME SERVER, THE PRIMARY-REFERENCE-TIME SOURCE IDENTIFIER AS PART OF THE PRT CORRECTION STEERING INFORMATION BLOCK (PCSIB) ~1012

- FURTHER RECEIVE, BY THE TIME SERVER, A PRIMARY-REFERENCE-TIME SOURCE IDENTIFIER WITH THE PRIMARY-REFERENCE-TIME (PRT) UPDATE, WHEREIN THE PRIMARY-REFERENCE-TIME SOURCE IDENTIFIER IS ONE PRIMARY-REFERENCE-TIME SOURCE IDENTIFIER OF MULTIPLE SELECTABLE PRIMARY-REFERENCE-TIME SOURCE IDENTIFIERS SUPPORTED FOR THE SERVER TIME PROTOCOL (STP) FACILITY AND SELECTABLE BASED, IN PART, ON THE TIME SOURCE AND CONFIGURATION OF THE COORDINATED TIMING NETWORK ~1014

- THE PRIMARY-REFERENCE-TIME SOURCE IDENTIFIER IS INDICATIVE OF A PRIMARY-REFERENCE-TIME (PRT) UPDATE HAVING BEEN DETERMINED USING THE PRECISION-TIME-PROTOCOL (PTP) TIME SOURCE ~1016

- THE PRIMARY-REFERENCE-TIME SOURCE IDENTIFIER IS INDICATIVE OF A PRIMARY-REFERENCE-TIME (PRT) UPDATE HAVING BEEN DETERMINED USING THE PRECISION-TIME-PROTOCOL (PTP) TIME SOURCE, AND BEING PROVIDED TO THE TIME SERVER OF THE COORDINATED TIMING NETWORK VIA A SECONDARY TIME SERVER OF THE COORDINATED TIMING NETWORK ~1018

- THE PRIMARY-REFERENCE-TIME (PRT) SOURCE IDENTIFIER IS INDICATIVE OF THE COORDINATED TIMING NETWORK FURTHER EMPLOYING A PULSE-PER-SECOND (PPS) SOURCE ALONG WITH PRIMARY-REFERENCE-TIME UPDATE INFORMATION OBTAINED USING THE PRECISION-TIME-PROTOCOL TIME SOURCE ~1020

FIG. 10B

THE PRIMARY-REFERENCE-TIME (PRT) SOURCE IDENTIFIER IS INDICATIVE OF THE COORDINATED TIMING NETWORK FURTHER EMPLOYING A PULSE-PER-SECOND (PPS) SOURCE ALONG WITH PRIMARY-REFERENCE-TIME UPDATE INFORMATION OBTAINED USING THE PRECISION-TIME-PROTOCOL TIME SOURCE, AND BEING PROVIDED TO THE TIME SERVER OF THE COORDINATED TIMING NETWORK VIA A SECONDARY TIME SERVER OF THE COORDINATED TIMING NETWORK ~1022

THE MULTIPLE SELECTABLE PRIMARY-REFERENCE-TIME SOURCE IDENTIFIERS INCLUDE:

A FIRST IDENTIFIER INDICATIVE OF A PRIMARY-REFERENCE-TIME (PRT) UPDATE HAVING BEEN DETERMINED USING THE PRECISION-TIME-PROTOCOL (PTP) TIME SOURCE ~1024

A SECOND IDENTIFIER INDICATIVE OF A PRIMARY-REFERENCE-TIME (PRT) UPDATE HAVING BEEN DETERMINED USING THE PRECISION-TIME-PROTOCOL (PTP) TIME SOURCE, AND BEING PROVIDED TO THE TIME SERVER OF THE COORDINATED TIMING NETWORK VIA A SECONDARY TIME SERVER OF THE COORDINATED TIMING NETWORK ~1026

A THIRD IDENTIFIER INDICATIVE OF THE COORDINATED TIMING NETWORK FURTHER EMPLOYING A PULSE-PER-SECOND (PPS) SOURCE ALONG WITH PRIMARY-REFERENCE-TIME UPDATE INFORMATION OBTAINED USING THE PRECISION-TIME-PROTOCOL (PTP) TIME SOURCE ~1028

A FOURTH IDENTIFIER INDICATIVE OF THE COORDINATED TIMING NETWORK FURTHER EMPLOYING A PULSE-PER-SECOND (PPS) SOURCE ALONG WITH PRIMARY-REFERENCE-TIME UPDATE INFORMATION OBTAINED USING THE PRECISION-TIME-PROTOCOL (PTP) TIME SOURCE AND BEING PROVIDED TO THE TIME SERVER OF THE COORDINATED TIMING NETWORK VIA A SECONDARY TIME SERVER OF THE COORDINATED TIMING NETWORK ~1030

FIG. 10C

FACILITATING PRECISION TIME PROTOCOL USE IN A COORDINATED TIMING NETWORK

BACKGROUND

A coordinated timing network (CTN) is a network in which multiple distinct computing systems maintain time synchronization to form the coordinated timing network. Systems in the coordinating timing network employ a message-based protocol, referred to as a server time protocol (STP), to pass timekeeping information between the systems over existing, high-speed data links. This enables the time of day (TOD) clocks at each system to be synchronized to the accuracy required in today's high-end computing systems. A computing system that provides time to other computing systems is referred to as a time server or server herein.

In one or more implementations, a timing network, such as a coordinated timing network, may utilize a network timing protocol (NTP) source to provide time synchronization. To provide a minimum required level of synchronization for certain of today's systems, the NTP approach may be combined with a pulse-per-second (PPS) signal, where each server has access to the pulse-per-second source to ensure all servers synchronize to the same reference time. This synchronization approach requires each server to have an external link to receive the pulse-per-second signal to achieve the desired degree of accuracy.

SUMMARY

Certain shortcomings of the prior art are overcome, and additional advantages are provided through the provision of a computer program product which includes a computer readable storage medium readable by one or more processors and storing instructions for execution by the one or more processors for performing a method. The method includes receiving at a time server of a server time protocol (STP) facility of a coordinated timing network (CTN) a primary-reference-time (PRT) update, with the primary-reference-time update having been determined with reference to a time source. The time source includes a precision-time-protocol (PTP) time source. The method further includes setting by the time server a primary-reference-time correction steering rate for the coordinated timing network based on receiving the primary-reference-time update, and broadcasting by the time server to one or more other servers of the coordinated timing network a PRT-correction-steering information block (PCSIB). The PRT-correction-steering information block includes a precision-time-protocol source identifier for the time source used in determining the primary-reference-time update, and the primary-reference-time correction steering rate set by the time server. In accordance with one or more aspects, the PRT-correction-steering information block is modified herein to include a precision-time-protocol source identifier, where the time source used in determining the primary-reference-time update is a precision-time-protocol (PTP) time source, which allows an operator of the coordinated timing network to select or change the external time reference source to PTP.

In one or more embodiments, the time source is one external time source of multiple external time sources supported for the server time protocol facility, and a coordinated timing network is an STP-only CTN. Further, another time source of the multiple external time sources includes a network timing protocol (NTP) time source. The ability to select between, for instance, an NTP time source (with or without pulse-per-second (PPS)) and a precision-time-protocol (PTP) time source provides greater flexibility depending on the coordinated timing network. Advantageously, precision-time-protocol (PTP) is a protocol that enables heterogenous systems which include clocks of various inherent precision, resolution, and stability to synchronize to a grandmaster clock. The protocol supports synchronization in the sub-microsecond range, with minimal network bandwidth and local clock computing resources. The protocol can enhance support for synchronization to better than 1 microsecond. In one or more embodiments, selecting precision-time-protocol (PTP) as time source for the primary-time-reference can result in greater time synchronization granularity than achievable with, for instance, network timing protocol (NTP).

In one or more embodiments, the primary-reference-time (PRT) update is received in a command, with the command being received at the time server from a hardware management console or support element coupled to the coordinated timing network.

In one or more implementations, the time server further receives a primary-reference-time source identifier with the primary-reference-time (PRT) update, and the broadcasting includes broadcasting, by the time server, the primary-reference-time source identifier as part of the PRT-correction-steering information block (PC SIB).

In one or more implementations, the primary-reference-time (PRT) source identifier of the command is one primary-reference-time source identifier of multiple selectable primary-reference-time source identifiers supported for the server time protocol facility, any one of which is selectable based, in part, on the time source and the configuration of the coordinated timing network.

For instance, in one or more embodiments, the primary-reference-time source identifier is indicative of a primary-reference-time (PRT) update having been determined using the precision-time-protocol (PTP) time source. In one or more other embodiments, the primary-reference-time source identifier is indicative of a primary-reference-time (PRT) update having been determined using the precision-time-protocol (PTP) time source, and being provided to the time server within the coordinated timing network via a secondary time server of the coordinated timing network.

In one or more further embodiments, the primary-reference-time (PRT) source identifier is indicative of the coordinated timing network employing a pulse-per-second (PPS) source along with primary-reference-time update information obtained using the precision-time-protocol time source.

In one or more implementations, the primary-reference-time (PRT) source identifier is indicative of the coordinated timing network employing a pulse-per-second (PPS) source along with primary-reference-time update information obtained using the precision-time-protocol time source, and being provided to the time server of the coordinated timing network via a secondary time server of the coordinated timing network.

In one or more embodiments, the selectable primary-reference-time source identifiers can include: a first identifier indicative of a primary-reference-time (PRT) update having been determined using the precision-time-protocol (PTP) time source; a second identifier indicative of a primary-reference-time (PRT) update having been determined using the precision-time-protocol (PTP) time source, and being provided to the time server of the coordinated timing network via a secondary time server of the coordinated timing network; a third identifier indicative of the coordinated timing network further employing a pulse-per-second (PPS) source along with primary-reference-time update information obtained using the precision-time-protocol (PTP) time source; and a fourth identifier indicative of the coordinated timing network further employing a pulse-per-second (PPS) source along with primary-reference-time update information obtained using the precision-time-protocol (PTP) time source and being provided to the server of the coordinated timing network via a secondary time server of the coordinated timing network. The above-noted new source identifier codes are added to the STP architecture, allowing the architecture to support precision-time-protocol, thereby facilitating greater time synchronization granularity than currently achievable with, for instance, a NTP time source. Depending on the application, enhanced time synchronization granularity can also be achieved herein without the use of a pulse-per-second (PPS) source.

Systems and computer-implemented methods relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 10A-10C depict details associated with one example of distributing a coordinated timing network primary-reference-time (PRT) correction steering information block (PCSIB) referencing a precision-time-protocol source identifier, in accordance with one or more aspects of the present invention;

DETAILED DESCRIPTION

Figure 1:
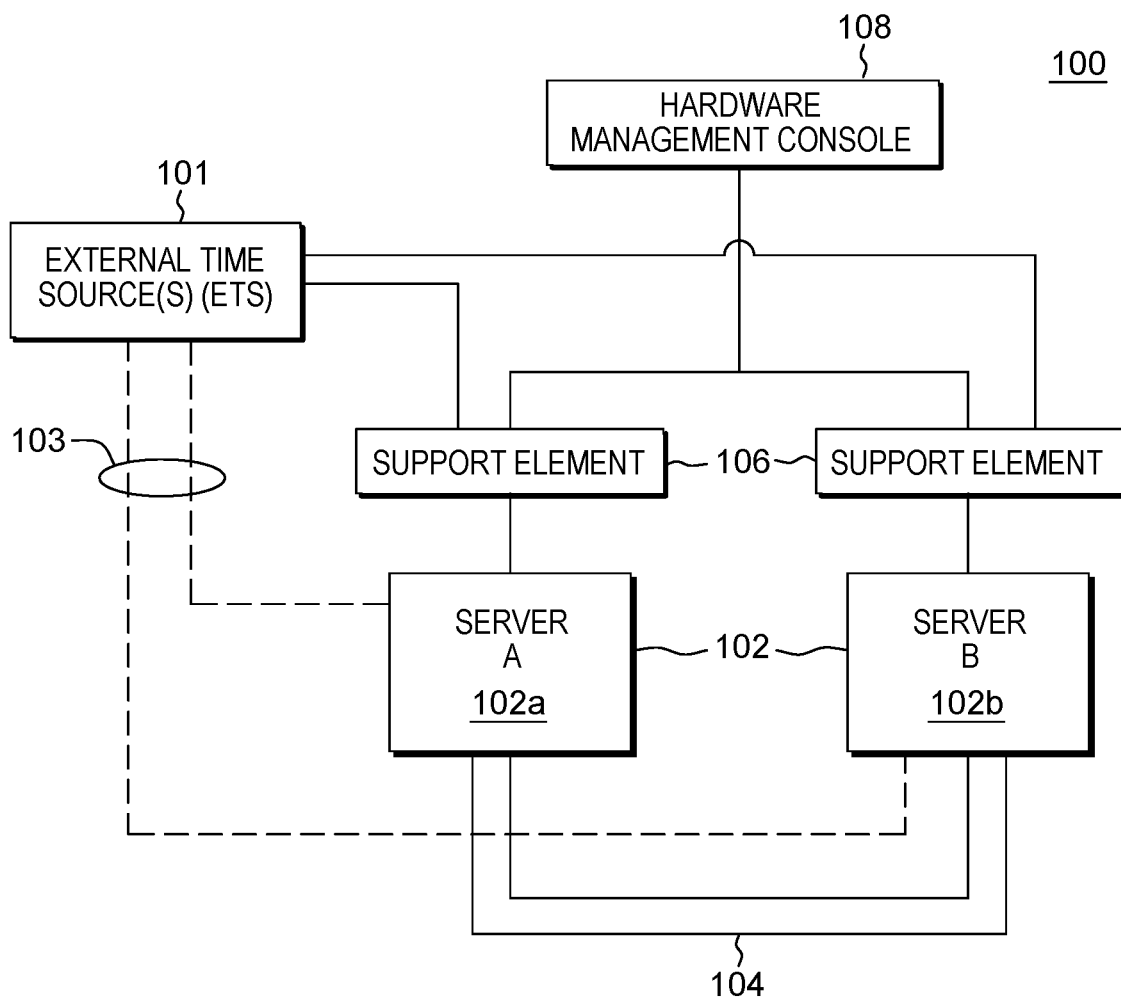
FIG. 1 depicts one example of a coordinated timing network; in accordance with one or more aspects of the present invention.

As noted, in a coordinated timing network, multiple distinct computing systems maintain time synchronization to form the coordinated timing network (CTN). Systems in the coordinated timing network employ a message protocol, referred to as a server time protocol (STP), to pass time keeping information between the systems over existing, high-speed data links. This enables the time of day (TOD) clocks at each system to be synchronized to the accuracy required in today's high-end computing systems. A computing system that provides an STP facility is referred to as a time server or server herein.

A coordinated timing network (CTN) is a collection of servers, each of which exchanges STP timekeeping messages with attached servers so that all servers in the CTN synchronize to coordinated server time (CST). Servers that make up a CTN are all configured with a common identifier, referred to as a CTN ID. The CTN configuration type and configuration information associated with the CTN dictate the manner in which the primary-type servers are determined in the CTN. The CTN ID contains information that identifies the CTN configuration type. All servers in a CTN maintain an identical set of time-control parameters that are used to coordinate the TOD-clock with coordinated universal time (UTC) and provide a local time offset for the CTN.

The coordinated server time (CST) in a CTN represents the time for the CTN. CST is determined at each server in the CTN and is accurate to a value specified by the CST dispersion.

A server defined in a CTN as a primary time server provides primary reference time for the CTN. The server in a CTN that determines CST (i.e., an estimate of the time of day (TOD) clock for the CTN) based on information from another server in the CTN is referred to as a secondary time server. As explained herein, the primary time server can obtain a primary reference time update from a support element and/or console using an external time source (ETS), which provides a means to synchronize the time of day clocks in a CTN to a defined time standard.

Servers in a CTN that are in a synchronized state are assigned a value, referred to as a stratum-level, which specifies the number of servers between it and a primary time server. A primary time server operates at a stratum-level of 1. A secondary time server operates at a stratum-level of 2 or above, which increases as the number of servers in the timing path to the stratum-1 increases. In general, the quality of timekeeping information decreases as the stratum-levels increase. The server that is unsynchronized is assigned a stratum-level 0.

The STP facility provides the procedures required to transmit and process STP messages. STP messages are transmitted over one or more physical data links between servers. The data link that has been established between two servers is referred as an STP path. The STP facility provides the facilities to establish and maintain STP paths.

A CTN can operate, for instance, in one of two types of configurations: either as a mixed-CTN configuration or as an STP-only CTN configuration. In a mixed-CTN confirmation, the servers are configured to be part of both an STP network and an external time reference (ETR) network. In an STP-only CTN, the servers and the CTN are configured to be part of an STP network, and none are configured to be part of an ETR network. One or more aspects disclosed herein relate to an STP-only CTN configuration.

At the active-stratum-1 server in an STP-only CTN, CST is defined to be equal to the TOD clock at the server with zero CST dispersion, and the server provides the root clock source for all other servers in the CTN. At secondary-time servers in a CTN, timekeeping information exchanged in STP messages with attach servers is used to determine a CST offset and CST dispersion. The CST offset represents the difference between the TOD clock at the server and CST, and the CST dispersion specifies the accuracy of the CST value. Each secondary-time server attempts to maintain its TOD clock synchronized to CST by making gradual steering adjustments to its TOD clock to reduce the CST offset value to zero.

The representation of a specific instance in time within a CTN is made using a timestamp in either STP-timestamp or coordinated universal time (UTC) timestamp format. With the exception of the message transmit and receive timestamps provided in exchange-time parameter (XTP) messages, or unless otherwise specified, all timestamps provided in STP message, console commands, and CTN parameter control blocks are in UTC-timestamp format. Timestamps maintained locally by the STP facility may be in STP-timestamp format.

One embodiment of a coordinated timing network is described with reference to FIG. 1. In this example, coordinated timing network 100 includes a plurality of servers 102 coupled to one another via one or more STP links 104, which are coupling channels that the STP shares to provide timing. For example, the plurality of servers 102 include server A 102a and server B 102b. Although in this example, two servers are depicted, coordinated timing network 100 can include additional servers. In one or more embodiments, each server can be coupled to a support or service element 106, and a hardware management console 108. The hardware management console can be the same console or a different console for each support element 106. Hardware management console 108 and/or support elements 106 couple to an external time source 101, or to a selected external time source of multiple external time sources (ETSs), in accordance with one or more aspects. Additionally, where a pulse-per-second (PPS) mode is available/used, direct links 103 couple the pulse-per-second source to each server of the coordinated timing network to provide the pulse-per-second signals directly to the servers, in accordance with a pulse-per-second (PPS) protocol.

As examples, each server is a central electronic complex (CEC) based on the z/Architecture® offered by International Business Machines Corporation (IBM) of Armonk, N.Y., USA. The hardware management console is, for instance, a personal computer, such as an Intel-based personal computer with a ROM (read only memory) as a particular example, or other type of computer or processing device that includes functionality to provide a standard interface for configuring and operating partitioned and SMP (Symmetric Multiprocessing) systems, such as System z® offered by International Business Machines Corporation; and each support element is, for instance, a workstation coupled to the central processing complex used for monitoring and operating the system. Example hardware management consoles and support elements are based on technology offered by International Business Machines Corporation. z/Architecture® is a registered trademark of International Business Machines Corporation, Armonk, N.Y., USA. One embodiment of the z/Architecture® is described in "z/Architecture Principles of Operation," IBM® Publication No. SA22-7832-11, 12th Edition, September 2017, which is hereby incorporated herein by reference in its entirety.

Figure 2:
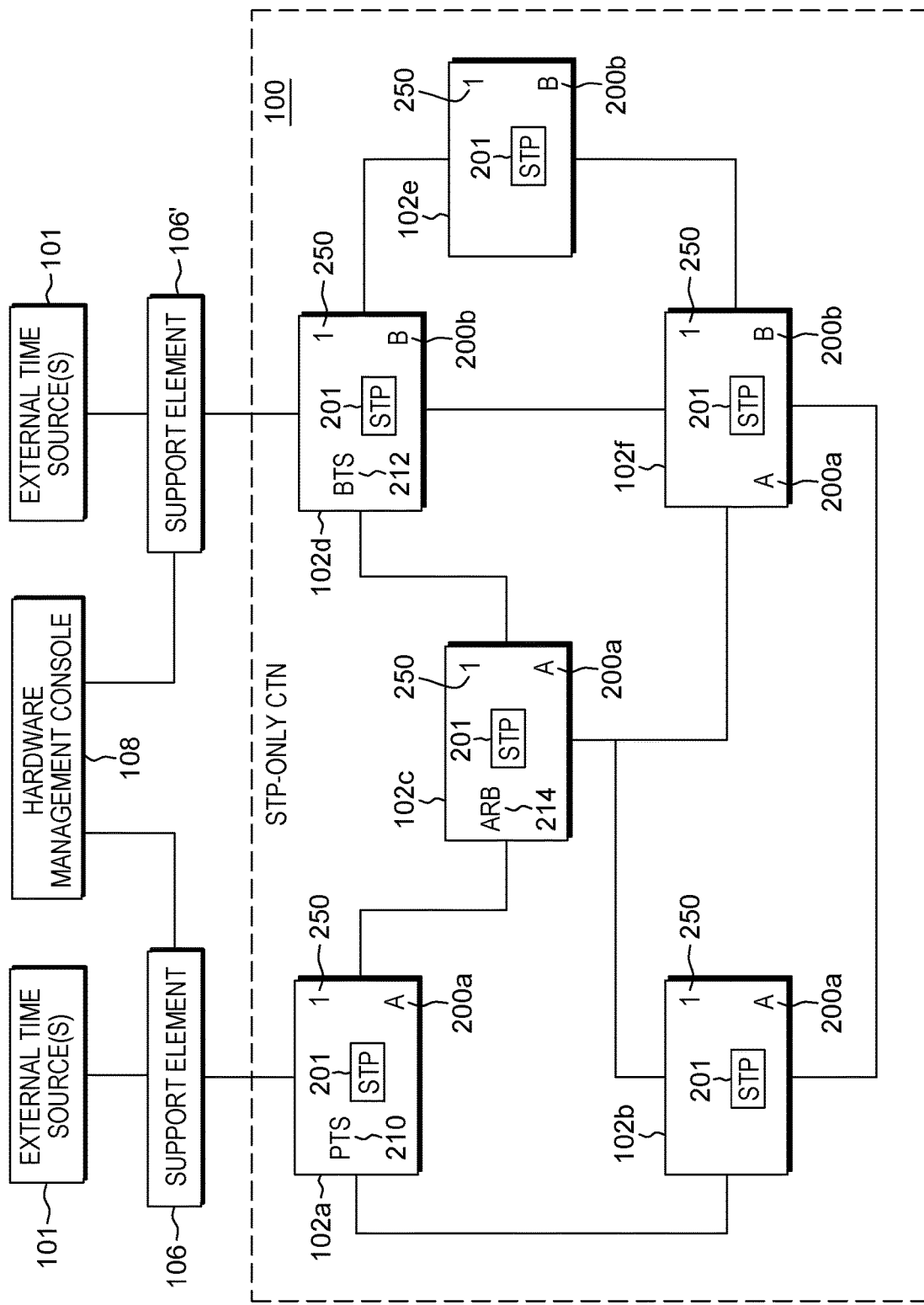
FIG. 2 depicts further details of a coordinated timing network, in accordance with one or more aspects of the present invention.

Further details regarding an embodiment of coordinated timing network 100 are described with reference to FIG. 2. In this example, coordinated timing network 100 includes a plurality of servers 102 (e.g., servers 102a-102f), and each server 102 includes one or more partitions 200 (e.g., logical partitions). Each partition is part of a particular Sysplex (system complex of servers), and the Sysplex of a particular partition is indicated by the letter A or B, in this example. Thus, partitions 200a are part of Sysplex A, and partitions 200b are part of Sysplex B, and an STP facility is provided in association with each server.

Further, in one example, one of the servers, server 102a, is a primary time server (PTS) 210 providing current time for coordinated timing network 100. Further, server 102d is a backup time server (BTS) 212 for coordinated timing network 100. Yet further, another server 102c is an arbiter (ARB) 214 for coordinated timing network 100. The arbiter server facilitates determination of a failure of the primary time server. As shown in FIG. 2, each server is part of a single coordinated timing network as indicated by a CTN ID 250 (e.g., CTN ID 1) in each server 102.

Although certain servers are indicated as providing the timing roles of primary time server, backup time server and arbiter, in one embodiment, these roles can be provided by the servers in conjunction with their support elements (see FIG. 1).

In the embodiment depicted each Sysplex has associated therewith a support element 106, 106' which, in one embodiment, are coupled to multiple external time sources 101, as well as to hardware management console 108. Note that in one or more other embodiments the external time sources 101 could couple to hardware management console 108, if desired.

As described further herein, in one or more implementations, the external time sources 101 include one or more time sources, including a precision-time-protocol time source, as well as potentially one or more other time sources, and the STP architecture is modified, in one or more aspects, such as described herein, to provide support for precision-time-protocol as an external primary time reference for the CTN.

An STP-console interface is provided which includes commands issued from a console/support element to the STP facility and commands issued from the STP facility to the console/support element. Commands issued by the console or support element include read, update, and write commands. Read commands are issued to retrieve STP configuration and timing information for display purposes. Console/support element update commands are used to modify configuration and timing information at a specific server in the timing network, or to make a global change to all servers in the coordinated timing network (CTN). Timing information that is displayed at the console can include, for instance, the TOD-clock, time zone information, daylight savings time and leap seconds. Configuration information that is displayed can include the CTN ID, network node information, and stratum-1 configuration. Write commands are used to provide various system state information to the STP facility.

Commands generated by the STP facility are used to store data to, for instance, console disk storage, to retrieve data from console disk storage, to provide notification of CTN configuration state changes, and to request services from the console/support element.

The support element/console provide access to one or more external time sources (ETS) 101, and support automatic, periodic updates of the primary-reference time at the CTN using time obtained from the ETS(s).

Persistent data required by the STP facility is maintained in non-volatile disk storage maintained by the console/support element. This information is provided to the STP facility at machine initialization, and is used to initialize the STP parameters. The data maintained in non-volatile storage includes the CTN ID, CTN time-control parameters, and the stratum-1 configuration. Any changes to these values made by the STP facility after initial machine load (IML) are stored to non-volatile storage using the STP generated save-CTN-parameters command.

STP console/support element commands and STP-generated commands are issued in the form of a command request block. A command response is provided for each command request and is provided in the form of a command response block. The command response block indicates whether the command was completed successfully. In one or more embodiments, a preset value is defined as a response code which indicates that the command was performed successfully, and any other response code indicates that the command was not performed successfully.

Commands issued by the console/support element include, for instance, modify CTN ID, set primary-reference time, modify stratum-1 configuration, set leap-second-offset, set time-zone algorithm, set daylight-savings-time offset, modify TOD-clock, set local clock server, and set PPS information. The read commands can include read CTN parameters and read STP-configuration information. STP-generated commands can include save CTN parameters, configuration change notification, STP event notification, retrieve CTN parameters, request primary-reference time update, request server state, retrieve oscillator identifiers, and request server state extended.

Update commands are issued by the console/support element to modify one or more CTN parameters. Each update command indicates the scope of the command and the time at which the command is to take effect. All update commands include a command transaction number that identifies the command to the initiating console element.

A command that is intended to update parameters at all servers in a CTN is referred to as a global-update command, and a command that is intended to update the parameters at a single server in the CTN is referred to as a local-update command. Whether a command is performed as a global or local command is command and command-parameter dependent. A command specified as global command that is issued to a stratum-0 server is accepted and performed as a local-update command, unless otherwise specified.

Update commands can be specified as either an intermediate or timed update. Intermediate update commands are scheduled to be performed at a time based on the maximum-freewheel interval. Timed update commands contain a parameter indicating the time at which the update is to be made in the CTN. Whether a command can be issued as an intermediate or a timed update is command dependent.

Certain global-update commands can be performed only at specific servers in a CTN, depending on the stratum-1 configuration for the CTN or the stratum level of the server. When a global-update command can only be initiated by specific servers, the update command must be sent directly to that server, otherwise, the command is rejected with a response code indicating the server is not able to perform the global command.

For instance, a set-primary-reference time command such as described herein has an allowable target server of the active-stratum-1 server, as well as the set pulse-per-second (PPS) information command, also described herein.

As noted, servers in a CTN that are in synchronized state are assigned a value, referred to as a stratum level, that specifies the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases.

All servers in an STP-only CTN are interconnected via direct links or via intermediary servers. In an STP-only CTN, only one server is the primary time server at any one time, and is referred to as the active-stratum-1 server. The active-stratum-1 server and the servers that are permitted to act as the active-stratum-1 server in an STP-only CTN are specified in the active-stratum-1 configuration for the CTN.

In an STP-only CTN configuration, the CTN time-control parameters are provided to the CTN via a console-command interface (or support element-command interface). The CTN time-control parameters are typically sent to the active-stratum-1 server in the CTN. The active-stratum-1 server receives the parameters and propagates the parameters to each secondary-time server in the CTN using the CTN-parameter-update procedure.

A technical problem is addressed and recognized herein with the current STP architecture for a coordinated timing network. In particular, there is a technical need to provide more stringent synchronization between the disparate systems or servers in a coordinated timing network than currently available with the network timing protocol (NTP) source approach. Further, although NTP can be combined with a pulse-per-second (PPS) signal as a primary-reference-time source, that approach requires each server in the coordinated timing network to have an external link to receive the pulse-per-second signal to achieve the enhanced degree of accuracy. These technical limitations, or complexities, are addressed herein by providing modifications to the STP architecture to allow selection or setting of primary reference time within an STP-only coordinated timing network to use an external precision-time-protocol time source. In particular, more precise clock synchronization between computer systems of a coordinated timing network is provided herein by adding/modifying STP architecture to support and include precision-time protocol, such as specified in IEEE 1588, to provide tighter synchronization than possible with NTP, and to provide an easier approach to implement time synchronization as a primary-reference-time for STP in comparison with NTP along with PPS. The modifications to the STP architecture allow PTP to be obtained from an external time source, and allow the configuration decision and results to be communicated within the coordinated timing network.

Precision-time-protocol (PTP) is a protocol that enables heterogeneous systems which include clocks of various inherent precision, resolution, and stability to synchronize to a grand master clock. The protocol supports synchronization in the sub-microsecond range, with minimal network bandwidth and local clock computing resources. The protocol can enhance support for synchronization to better than one microsecond.

More particularly, the IEEE 1588 precision-time-protocol (PTP) standard is used herein to provide more precise clock synchronization between computer systems using a precision time protocol (PTP) source as external reference time for a coordinated timing network (CTN). In particular, in one or more aspects, the set-primary-reference-time command request block and set-pulse-per-second information command block are modified herein for a coordinated timing network to support/include precision-time-protocol as a primary-reference-time source.

Primary-reference time (PRT) is maintained at each primary-time server in a CTN, and is the reference time for the CTN. In an STP-only CTN, PRT is provided by the console/service element or by a direct-attach external time source. When synchronization with coordinated universal time (UTC) is required, PRT is based on UTC and an external time source is used for this purpose. The PRT source used for a CTN is identified by, for instance, a four-byte code field, referred to herein as the PRT source identifier. The PRT source identifier is used by the set-primary-reference-time command.

The set-primary-reference-time command, when issued to the active-stratum-1 server, is a global CTN update command that provides primary-reference-time (PRT) information that can be used by the STP facility to set the primary-reference-time source and associated primary-reference-time parameters. The particular primary-reference-time source used by the STP facility, architected as described herein, is dependent on the time sources available to the STP facility and on the state of the STP facility. The primary-reference-time source and associated parameters being used at the STP facility can be provided in the response block of the read-CTN-parameters command.

As noted, in one or more embodiments, the ability to use or select a precision-time-protocol (PTP) reference time source for a coordinated timing network is provided herein, which has not been possible with existing CTN embodiments.

Figure 3:
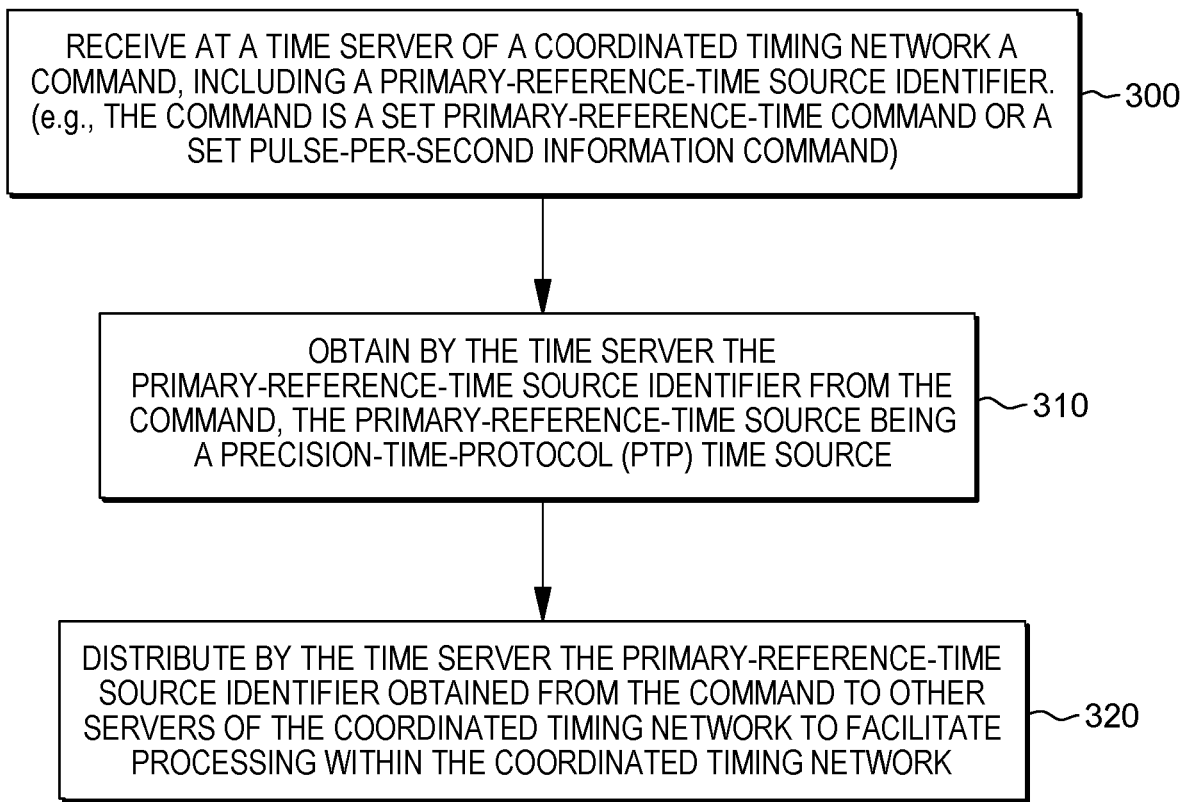
FIG. 3 depicts one embodiment of a process to distribute a primary-reference-time (PRT) source identifier within a timing network to use a precision-time-protocol time source, in accordance with one or more aspects of the present invention.

FIG. 3 depicts one embodiment of a process for implementing selection and/or setting of a coordinated timing network to reference a primary-reference-time source employing precision-time-protocol for determining CST. As shown, a time server, such as the primary time server, of a coordinated timing network, receives a command including a primary-reference-time source identifier identifying a time source for the server time protocol facility 300. The command can be, in some embodiments, a CTN set primary-reference-time command, or a CTN set pulse-per-second information command. The time server obtains a primary-reference-time source from the primary-reference-time source identifier from the command, where the time source is, or includes, a precision-time-protocol (PTP) time source 310. The time server distributes the primary-reference-time source identifier obtained from the command to other servers of the coordinated timing network to facilitate processing within the coordinated timing network 320, such as by one or more operating systems within the coordinated timing network.

The primary-reference-time (PRT) source in use for a CTN can be identified using, for instance, a 4-byte-EBCDIC field, referred to as a PRT-source identifier. In an STP-only CTN, the PRT-source identified for the CTN can be distributed using the PRT-correction-steering-information block. Certain PRT sources and associated PRT-source identifiers are defined below, by way of example. The types of PRT sources supported by a server are model dependent. Disclosed herein is a new set-primary-reference-time command that will now allow, for instance, precision-time-protocol to be referenced in the primary-reference-time source ID field, and used in determining a primary-reference-time update.

Code Meaning

CNTP: Console (or support element) using NTP—the console (or support element) calculated PRT using an NTP interface and provided it to the CTN using the set-PRT command or the set-PPS-information command.

CNTX: Console (or support element) using NTP from a secondary server—the console (or support element) calculated PRT using an NTP interface and provided it to the CTN using the set-PRT command or the set-PPS-information command via a secondary server.

CPTP: Console (or support element) using PTP—the console (or support element) calculated the PRT using a PTP (IEEE 1588) time source and provided it to the CTN using the set-PRT command or the set-PPS-information command.

CPTX: Console (or support element) using PTP from a secondary server—the console (or support element) calculated the PRT using a PTP interface and provided it to the CTN using the set-PRT command or the set-PPS-information command via a secondary server.

PPPS: PPS with a PTP reference source—the CTN is using a PPS source along with PRT information obtained by the console (or support element) using a PTP interface.

PPPX: PPS with a PTP reference source from a secondary server—the CTN is using a PPS source along with PRT information obtained by the console (or support element) using a PTP interface and provided to the CTN via a secondary server.

PPSN: PPS with an NTP reference source—the CTN is using a PPS source along with PRT information obtained by the console (or support element) using an NTP interface.

PPSX: PPS with an NTP reference source at a secondary server—the CTN is using a PPS source along with PRT information obtained by the console (or support element) using an NTP interface and provided to the CTN via a secondary server.

Figure 4:
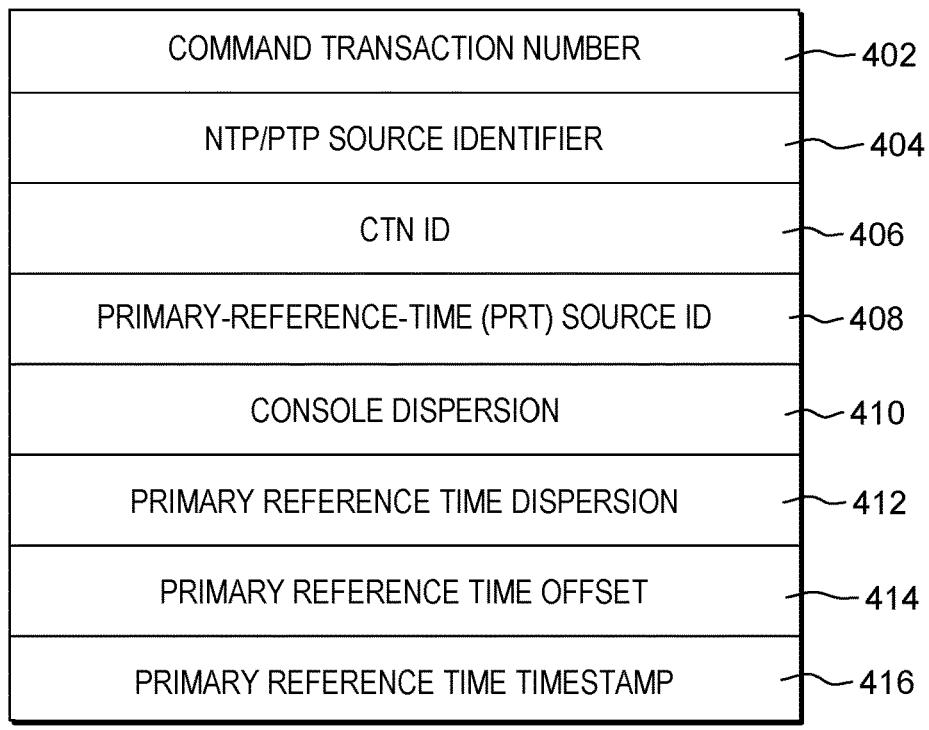
FIG. 4 depicts one example of a set primary-reference-time (PRT) command request block, used in accordance with one or more aspects of the present invention.

One example of a new set primary-reference-time command request block is described with reference to FIG. 4. As one example, a new CTN set primary-reference-time command request block 400 includes, for instance, a command transaction number 402, which can be a value associated with the command being issued, and which is then returned in the response block for the command; an NTP/PTP-source identifier 404, which identifies the reference source of the NTP or PTP server, respectively, when primary-reference-time source ID contains CNTP or CPTP, as defined above; CTN ID 406 contains the CTN ID of the CTN targeted for the command; primary-reference-time source ID 408 contains an identification of the source of the primary reference time provided in the format specified above; console (or support element) dispersion 410 contains a value indicating the dispersion between the primary reference time at the console (or support element) and the active-stratum-1 server; primary-reference-time dispersion 412 contains a value indicating the dispersion of the primary reference time at the console (or support element) relative to the actual primary reference time; primary-reference-time offset 414 contains the offset of the actual primary reference time relative to the active-stratum-1 system time of day clock as determined by the console (or support element) at the time the most recent primary-reference-time information was received; and primary reference timestamp 416 contains a timestamp indicating when the primary reference time was last obtained at the console (or support element), with the field being, for instance, in UTC-timestamp format. Note that although various fields are described herein, more, less and/or different fields can be included in the new CTN set-primary-reference-time command block without departing from the spirit of one or more aspects of the present invention.

Figure 5:
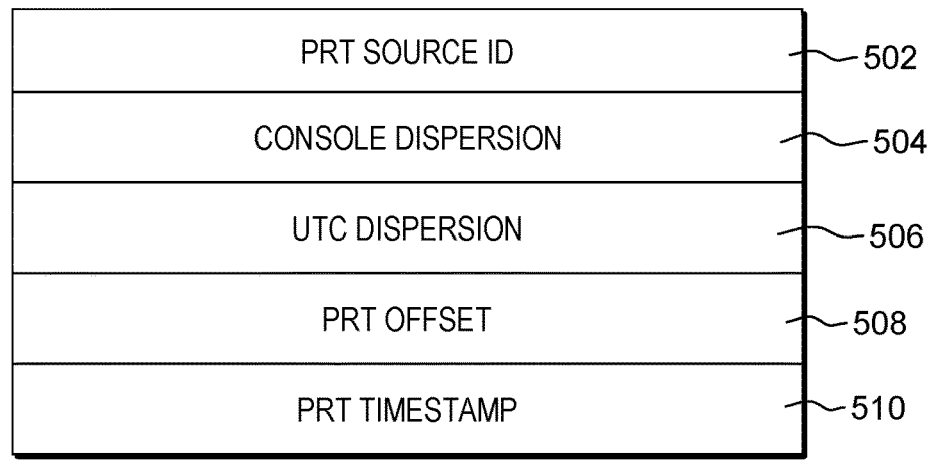
FIG. 5 depicts one example of a primary-reference-time (PRT) data array at a primary time server of a coordinated timing network, in accordance with one or more aspects of the present invention.

The data from each primary-reference time (PRT) update is maintained in a PRT-data array at the primary-time server. The array contains the data from N most recent PRT updates, wherein N can be for instance, greater than 1 and less than 50. When a new update is received, it replaces the oldest entry in the array. Each entry can have, by way of example, the format depicted in FIG. 5. As illustrated, each PRT-data array entry 500 can include the PRT source ID 502 which identifies the primary-reference time source provided in the set-primary-reference time command; console dispersion 504, which contains the console (or support element) dispersion provided in the set-primary-reference time command; UTC dispersion 506, which contains the UTC dispersion provided in the set-primary-reference time command; PRT-offset 508, which contains the PRT-offset provided in the set-primary-reference time command; and PRT-timestamp 510, which contains the PRT-timestamp provided in the set-primary-reference time command stored, for instance, in UTC-timestamp format.

Figure 6:
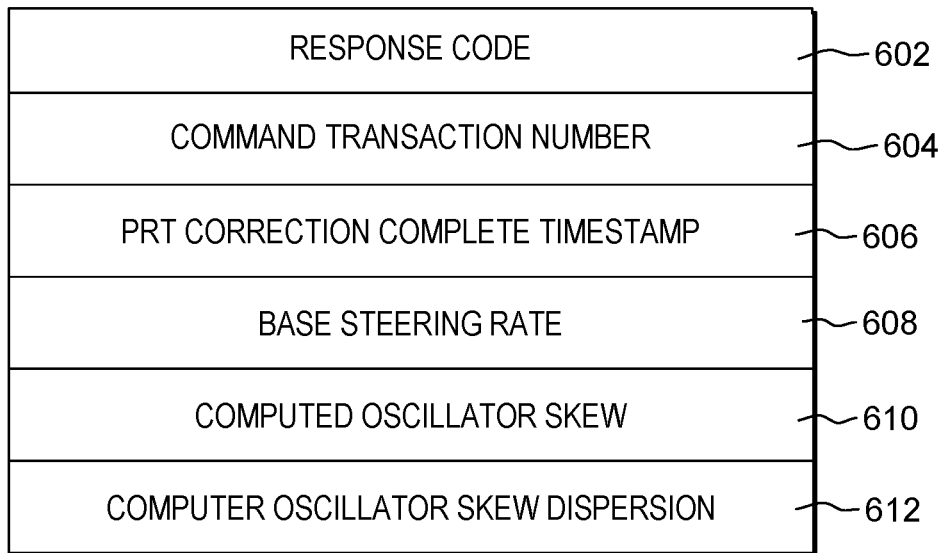
FIG. 6 depicts one example of a primary-reference-time (PRT) command response block, used in accordance with one or more aspects of the present invention.

FIG. 6 depicts one embodiment of a set-primary-reference time command response block which can be sent responsive to the set-primary-reference time command block. As illustrated, set-primary-reference time command response block 600 can include, by way of example, a response code 602 entry, which indicates that the command was (or was not) completed successfully; a command transaction number 604, which contains the value provided in the command-transaction-number field of the command request block; a PRT correction complete timestamp 606 which contains a UTC-timestamp indicating the time at which the PRT correction will be complete; a base steering rate 608, which contains the base steering rate for the server; a computed oscillator skew 610, which contains the computed oscillator skew of the time of day clock at the server relative to nominal frequency, with the value being calculated by the STP facility using the data in the PRT-data array using a model-dependent algorithm; and a computed oscillator skew dispersion 612, which specifies the dispersion of the computed oscillator skew for the server, with the value being calculated by the STP facility using a model-dependent algorithm. The time of day clock oscillator can be considered out-of-tolerance when the absolute value of the computed oscillator skew 610 is greater than the sum of the maximum allowable oscillator skew and the computed oscillator skew dispersion 612.

Depending on the implementation, the servers can be provided with external time reference (ETR) ports which can be utilized in a pulse-per-second mode. When PPS attachment facility is installed, each ETR port can operate in a PPS-attachment mode. When an ETR port is in a PPS-attachment mode, and a pulse-per-second (PPS) signal generator is connected to the port, the PPS signal causes the current value of the physical TOD-clock to be stored in an ETR register, and is referred to as a timestamp event (TSE). For CTNs that are required to track to UTC, the PPS signal generator must be tracking to UTC with a zero phase shift. When the CTN is in PPS mode, the active stratum-1 server uses the TSE to determine the PRT-offset of the system-TOD-clock. This offset is used to perform PRT correction.

A CTN that is not in PPS mode can enter PPS mode when at least one PPS port at the active-stratum-1 server, or at a secondary server, has a valid PPS-offset. To enter PPS mode, the CTN-parameter-update procedure is performed to update the PRT-source identifier within the CTN to, for instance, PPSN. If the selected port is on the active-stratum-1 server, or to PPSX if the selected port is on the secondary server. The CTN enters PPS mode when the update completes and an STP-event notification command is issued to the console indicating a PPS-event, and the PPS-event code qualifier set to PPS-mode is entered. When a CTN has entered PPS mode, the console dispersion in the PRT-correction-steering information block (PCSIB), is set to zero. When in PPS mode, the stratum-1 server steers out the PPS-offset for the selected PPS port using the PRT-correction-steering algorithm, and, using multiple TSE samples, establishes a base steering rate value to correct the oscillator error. The algorithm used to calculate the oscillator-error is model-dependent. When the CTN is in PPS mode, the console can attempt to provide PPS information to the CTN via a set PPS information command (described below) on a periodic basis at a frequency that is model-dependent. The allowable period of time between SPI command attempts is referred to as the SPI interval. The command is issued when the following PPS parameters as provided by the PPS source are modified: the PPS reference source identifier, or the PPS source stratum.

Figure 7:
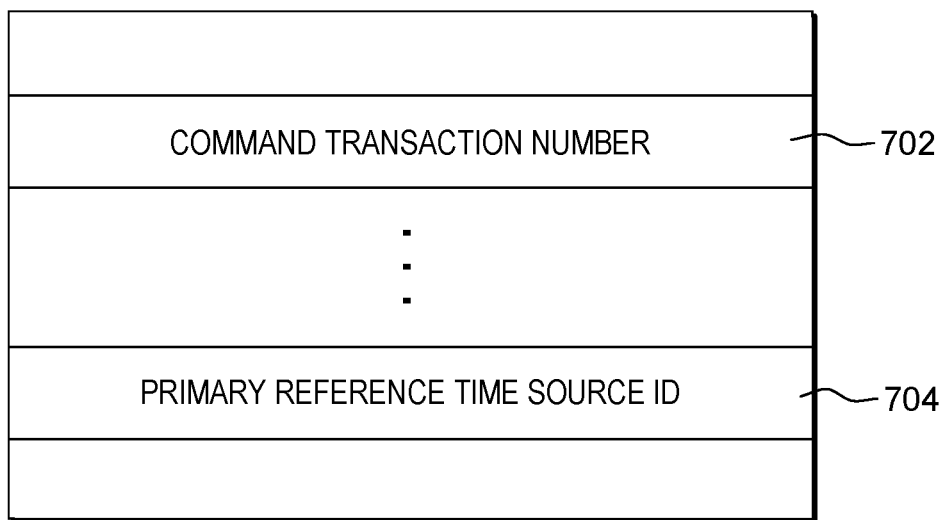
FIG. 7 depicts one example of a set pulse-per-second information command request block, used in accordance with one or more aspects of the present invention.

An example of a CTN set-PPS-information command block is provided in FIG. 7. As one example, the CTN set-PPS-information command block 700 includes, for instance, a command transaction number 702, which includes a value associated with a command being issued, with the command transaction number being returned in the response block for the command; and a primary-reference-time source ID 704, which contains the primary-reference-time-source identifier for the CTN, such as described above in connection with the CTN set-primary-reference-time command block. Note that, although certain fields are depicted in FIG. 7, typically, more and/or different fields can be included in the CTN set-PPS-information command block, without departing from the spirit of one or more aspects of the present invention.

The format of the set PPS information command response block can include, for instance, a response code, which contains the response code for the command, and the command transaction number, which contains the value provided in the command-transaction-number field of the command request block.

Note that the console (or support element) can issue the set-PPS-information command and the set-PRT command to secondary servers to provide an alternate path for the active-stratum-1 server to obtain PPS and PRT information. When NTP-only information is available at the console (or support element), the set-PRT command is used to transmit the NTP-PRT information to the secondary server, and when the NTP server is also providing a PPS signal to the secondary server, the set-PPS information command is used to transmit both NTP and PPS information to the secondary server. A secondary server, that is, at a stratum-2, that has received a set-PPS-information or set-PRT command provides the information from the command to the active-stratum-1 by sending the secondary-PPS-information message to the active-stratum-1 server. The set-PPS-information and set-PRT commands are issued to secondary servers at the same frequency they are issued to the active-stratum-1 server. The use of secondary-PPS information by the active-stratum-1 server can depend on whether the information contains PPS port attachment information or NTP-only information. As explained, the STP architecture is modified herein to also allow secondary servers to provide an alternative path for the active-stratum-1 server to obtain PPS and/or PRT information in cases when PTP information is available at the console (or support element), as well as when the PTP server is providing a PPS signal to the secondary server.

By way of further explanation, the set-PPS-information (SPI) command is a local command that provides information regarding PPS connections at the server receiving the command. The command is issued by the console (or support element) to enable or disable PPS operation when available, and to provide information regarding the operational characteristics of the PPS connections. The command can also optionally provide primary-reference-time information. The primary-reference-time information provided would be as described above in connection with the set-PRT command. When PRT information is provided, the PRT-source identifier must equal PPPS or PPSN; otherwise, a PPS code error is recognized. The command, when issued to an inactive-stratum-1 server, is a local command that provides primary-reference-time (PRT) information that can be used by the inactive-stratum-1 server to verify the accuracy of the PPS signals it may be receiving, and to have the information needed to take over as the active-stratum-1 server. The command does not result in any changes to the PRT-source identifier or in the PRT steering.

Depending on the source of the primary-reference-time (PRT), PRT updates can be provided to the active-stratum-1 server on a periodic basis. Depending on the frequency of the updates, the time of day (TOD) at a server may drift from the reference time due to oscillator differences. To correct the accumulated TOD-clock error, the active-stratum-1 server sets a primary-reference-time correction steering rate for the CTN to adjust or correct the difference.

When the primary-reference-time (PRT) is provided by the console (or service element), reference time updates are provided periodically using the set-primary-reference-time console command. When the active-stratum-1 server begins a new PRT-correction-steering period, it provides PRT information to all secondary time servers in the CTN by broadcasting the PRT-correction-steering information block (PC SIB) using the CTN-parameter update procedure. The information provided in the PCSIB includes the steering start time and total time that the PRT-correction-steering is to occur. The rate at which the correction-steering is performed is not specified in the PCSIB, but does not increase or decrease at a rate which exceeds 1 part per million (PPM) per CTN maximum-freewheel interval, and does not exceed the maximum steering rate allowed for primary-time servers. Secondary-time servers determine the steering rate by detecting changes in the CST offset as calculated by the STP timekeeping algorithms, and incorporate the PRT-correction-steering into their base-steering rate. At the end of the PRT-correction-steering period, the PRT-correction-steering value is equal to zero at the active-stratum-1 server.

As noted, information from each PRT update is maintained by the active-stratum-1 server in a PRT-data array. The data in the PRT-data array is used to determine the base-steering rate and computed oscillator skew. As noted, to correct the accumulated TOD-clock error, the active-stratum-1 server sets a primary-reference-time correction steering rate for the CTN to adjust or correct the difference. By way of example, assume that if every hour the PRT update command is received and tells the CEC that it has to steer three miliseconds forward to synchronize to the external time source, the base steering rate of three miliseconds per hour (effectually making the clock on the system run that much faster) is set, meaning that a future PRT update should be received with close to zero required steering.

As discussed, to correct the accumulated TOD-clock error, the active-stratum-1 server sets the PRT-correction-steering rate for the CTN. To perform this function, the active-stratum-1 server broadcasts the PC SIB. The PC SIB is maintained at each server in the CTN and contains the CTN's PRT-correction-steering information. The PC SIB contains details on the PRT source and identifiers. In accordance with one or more aspects of the present invention, the PCSIB command is re-architected to include support for a precision-time-protocol source.

Figure 8:
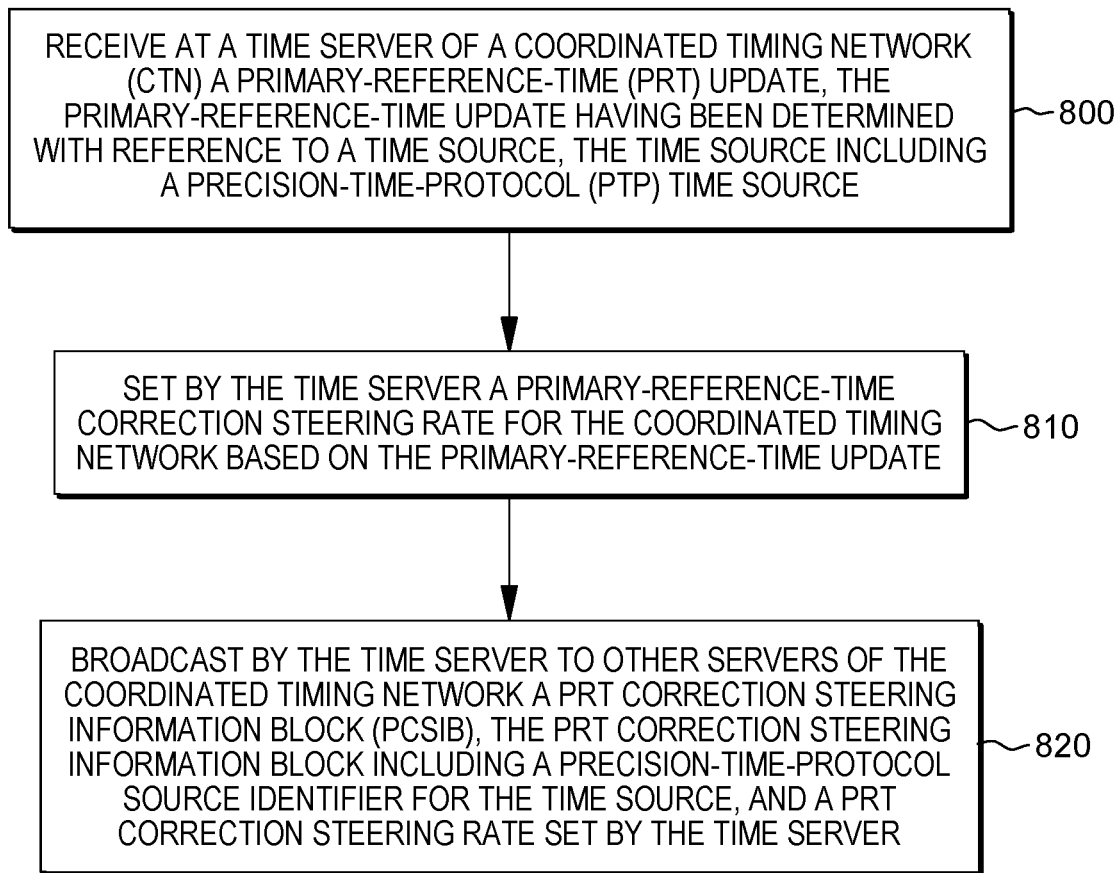
FIG. 8 depicts one embodiment of a process for setting and broadcasting by a time server a primary-reference-time (PRT) correction steering rate for a coordinated timing network using a PRT-correction-steering information block (PCSIB), in accordance with one or more aspects of the present invention.

FIG. 8 depicts one embodiment of a process to set and broadcast the primary-reference-time correction steering rate from the active-stratum-1 server, in accordance with one or more aspects disclosed herein. A primary-reference-time (PRT) update is received at a time server of a coordinated timing network (CTN) 800. The primary-reference-time update is determined from a time source for a server time protocol (STP) facility of the coordinated timing network, where the time source has a precision-time-protocol (PTP) interface. The time server sets a primary-reference-time correction steering rate for the coordinated timing network based on the primary-reference-time (PRT) update 810, and broadcasts to other servers of the coordinated timing network a PRT-correction-steering information block (PCSIB) 820. The PRT-correction-steering information block includes a precision-time-protocol source identifier for the reference time source, and the primary-reference-time correction steering rate set by the time server.

Figure 9:
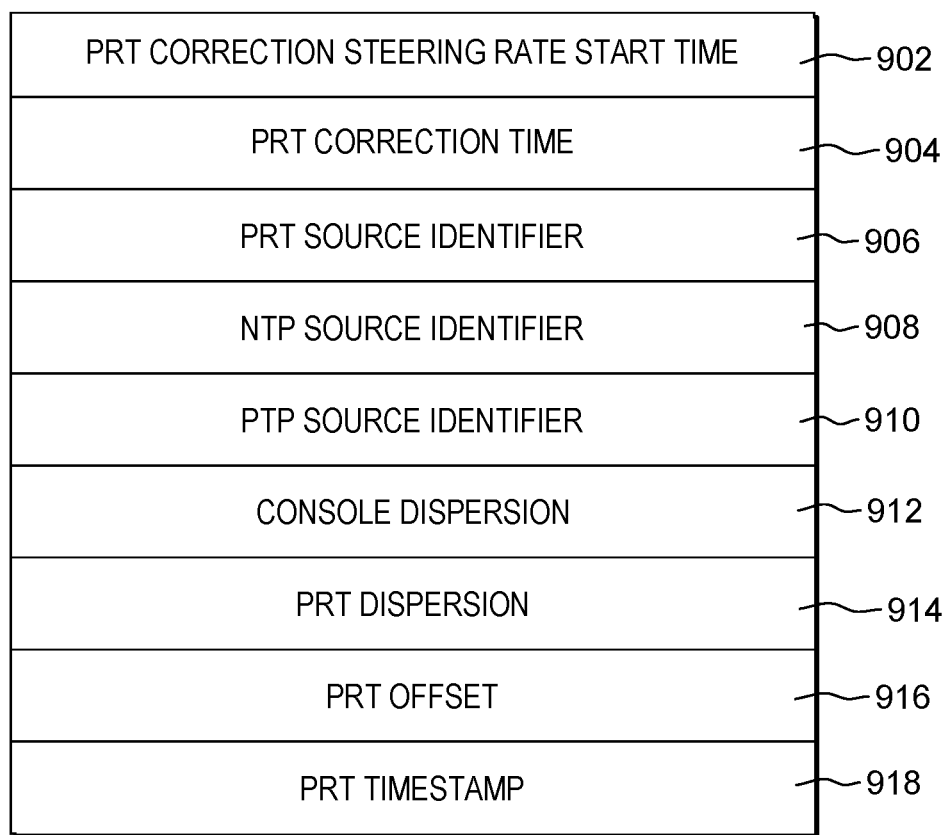
FIG. 9 depicts one example of a PRT-correction-steering information block maintained at each server of a coordinated timing network using server time protocol with precision-time-protocol capability, in accordance with one or more aspects of the present invention.

FIG. 9 depicts an example of a new PRT-correction-steering information block (PCSIB) 900 maintained at each server, and containing the PRT-correction-steering information for the CTN. As one example, the PRT-correction-steering information block 900 includes, for instance, PRT-correction-steering rate start time 902, which can contain a UTC timestamp indicating the time at which the PRT-correction-steering is to be initiated; PRT-correction time 904 specifies the estimated amount of time required to correct the PRT-offset, which is the amount of time PRT-correction will be in effect; PRT source identifier 906 contains a primary-reference-time source identifier in use for the CTN, as described herein; NTP source identifier 908 contains CNTP or PPSN, identifying the reference source specified by an NTP server (when specifying CNTP, the value is set to the NTP-source identifier in the set-PRT or SPI command, and when specifying PPSN, the value is set to the selected PPS-source identifier from the SPI command); PTP-source identifier 910 contains CPTP or PPPS identifying the reference source specified by the PTP server (when specifying CPTP, the value is set to the PTP-source identifier in the set-PRT or SPI command, and when specifying PPPS, the value is set to the selected PPS-source identifier from the SPI command); console (or support element) dispersion 912 specifies the maximum possible error associated with the transfer of PRT between the console (or support element) and the STP facility; PRT dispersion 914 specifies the maximum possible error of the primary-reference time when it is made available by the primary-reference-time source, and the value does not include console (or support element) dispersion; PRT-offset 916 specifies the estimated difference between the system TOD-clock at the active-stratum-1 server and the time at the primary-reference-time source; and PRT timestamp 918 contains a timestamp that specifies the time at which the PRT was obtained by the active-stratum-1 server, with the field being in UTC-timestamp format 918. Note again that although certain fields are depicted in FIG. 9, typically, more, less and/or different fields can be included in the PRT-correction-steering information block without departing from the spirit of one or more aspects of the present invention.

Further details associated with one example of facilitating setting primary-reference-time of a server time protocol facility of a coordinated timing network to a precision-time-protocol source, in accordance with one or more aspects of the present invention, are described with reference to FIGS. 10A-10C.

Referring to FIG. 10A, a time server of a server time protocol (STP) facility of a coordinated timing network (CTN) receives a primary-reference-time (PRT) update, with the primary-reference-time update having been determined with reference to a time source that includes a precision-time-protocol (PTP) time source (1000). The time server sets a primary-reference-time correction steering rate for the coordinated timing network based on receiving the primary-reference-time update (1002), and broadcasts to one or more other servers of the coordinated timing network a PRT-correction-steering information block (PC SIB) (1004). The PRT-correction-steering information block includes a precision-time-protocol source identifier for the time source used in determining the primary-reference-time update and the primary-reference-time-correction steering rate set by the time server.

As an example, the time source is one external time source of multiple external time sources supported for the server time protocol facility, and the coordinated timing network is an STP-only CTN (1006). Further, as one example, another time source of the multiple external time sources includes a network timing protocol (NTP) time source (1008).

Referring to FIG. 10B, in one embodiment, the primary-reference-time (PRT) update is received in a command, with the command being received at the time server from at least one of a hardware management console or support element coupled to the coordinated timing network (1010).

In one embodiment, the time server further receives a primary-reference-time source identifier with the primary-reference-time (PRT) update, and the broadcasting includes broadcasting, by the time server, the primary-reference-time source identifier as part of the PRT-correction-steering information block (PCSIB) (1012).

In one or more embodiments, the time server receives a primary-reference-time source identifier with the primary-reference-time (PRT) update, and the primary-reference-time source identifier is one primary-reference-time source identifier of multiple selectable primary-reference-time source identifiers supported for the server time protocol (STP) facility, any one of which is selectable based, in part, on the time source and configuration of the coordinated timing network (1014). For instance, the primary-reference-time source identifier can be indicative of a primary-reference-time (PRT) update having been determined using the precision-time-protocol (PTP) time source (1016). In another embodiment, the primary-reference-time source identifier can be indicative of a primary-reference-time (PRT) update having been determined using the precision-time-protocol (PTP) time source, and being provided to the time server of the coordinated timing network via a secondary time server of the coordinated timing network (1018). In a further embodiment, the primary-reference-time (PRT) source identifier can be indicative of the coordinated timing network further employing a pulse-per-second (PPS) source along with primary-reference-time update information obtained using the precision-time-protocol time source (1020).

As shown in FIG. 10C, in another embodiment, the primary-reference-time (PRT) source identifier can be indicative of the coordinated timing network further employing a pulse-per-second (PPS) source along with primary-reference-time update information obtained using the precision-time-protocol time source, and being provided to the time server of the coordinated timing via a secondary time server of the coordinated timing network (1022).

In one or more embodiments, the selectable primary-reference-time source identifiers include: a first identifier indicative of a primary-reference-time (PRT) update having been determined using the precision-time-protocol (PTP) time source (1024); a second identifier indicative of a primary-reference-time (PRT) update having been determined using the precision-time-protocol (PTP) time source, and being provided to the time server of the coordinated timing network via a secondary time server of the coordinated timing network (1026); a third identifier indicative of the coordinated timing network further employing a pulse-per-second (PPS) source along with primary-reference-time update information obtained using the precision-time-protocol (PTP) time source (1028); and a fourth identifier indicative of the coordinated timing network further employing a pulse-per-second (PPS) source along with primary-reference-time update information obtained using the precision-time-protocol (PTP) time source and being provided to the time server of the coordinated timing network via a secondary time server of the coordinated timing network (1030).

Further exemplary embodiments of a computing environment to implement one or more aspects of the present invention are described below with reference to FIGS. 11-13.

Figure 11:
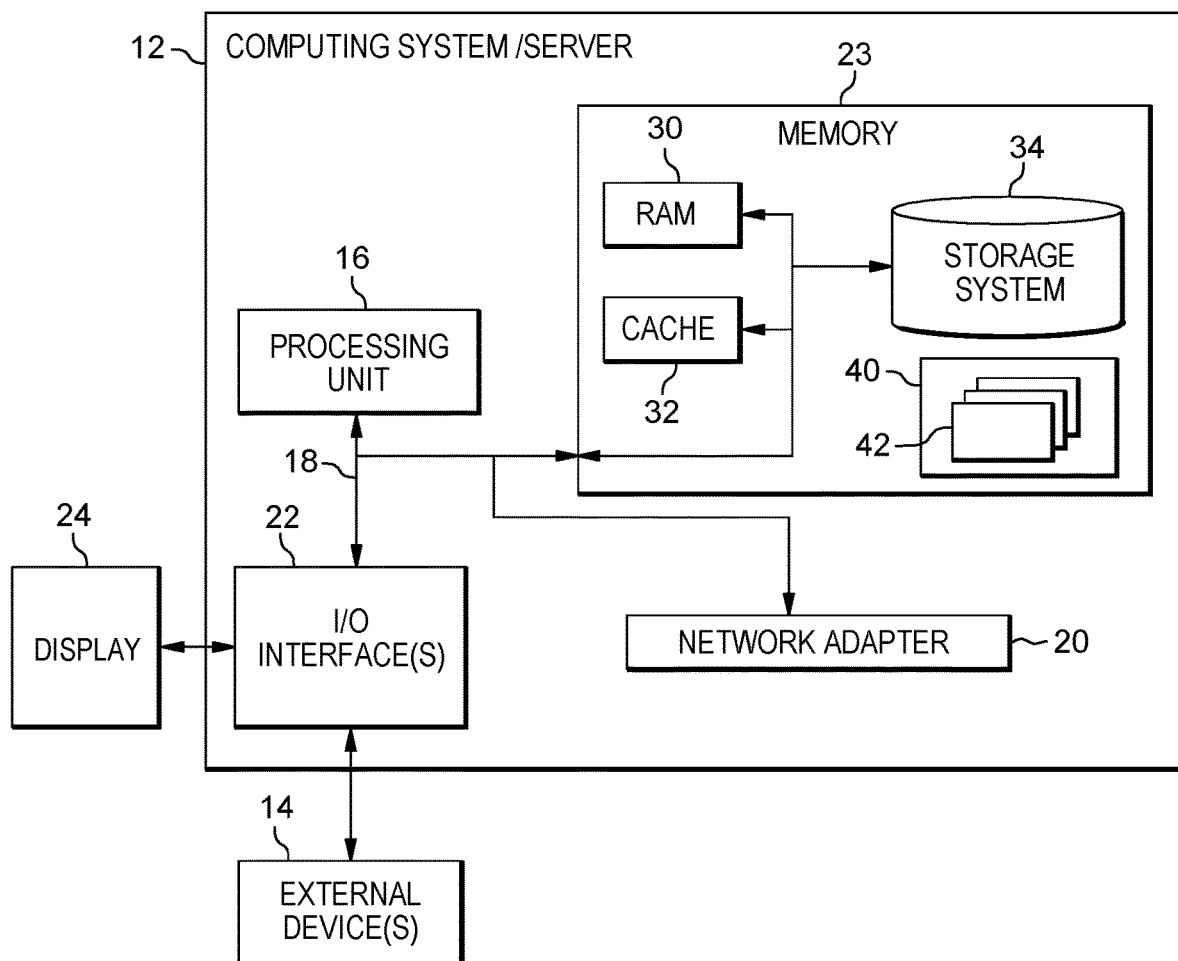
FIG. 11 depicts one example of a cloud computing node, in accordance with one or more aspects of the present invention.

By way of further example, FIG. 11 depicts one embodiment of a computing environment 10, which includes a computing system 12. Examples of well-known computing systems, environments, and/or configurations that may be suitable for use with computer system 12 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 12 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 11, computing system 12, is shown in the form of a general-purpose computing device. The components of computing system 12 can include, but are not limited to, one or more processors or processing units 16, a system memory 23, and a bus 18 that couples various system components including system memory 23 to processor 16.

In one embodiment, processor 16 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture Principles of Operation," IBM® Publication No. SA22-7832-11, 12th Edition, September 2017, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 12 can include a variety of computer system readable media. Such media may be any available media that is accessible by computing system 12, and it includes both volatile and non-volatile media, removable and non-removable media.

System memory 23 can include computer system readable media in the form of volatile memory, such as random access memory (RAM) 30 and/or cache memory 32. Computing system 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 18 by one or more data media interfaces. As described below, memory 23 can include at least one program product having a set (e.g., at least one) of program modules or code that are configured to carry out the functions of embodiments of the invention.

Program/utility 40, having a set (at least one) of program modules 42, can be stored in memory 32 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computing system 12 can also communicate with one or more external devices 14 such as a keyboard, a pointing device, a display 24, etc.; one or more devices that enable a user to interact with computing system 12; and/or any devices (e.g., network card, modem, etc.) that enable computing system 12 to communicate with one or more other computing devices. Such communication can occur via Input/Output (I/O) interfaces 22. Still yet, computing system 12 can communicate with one or more networks such as a local area network (LAN), a general wide area network (WAN), and/or a public network (e.g., the Internet) via network adapter 20. As depicted, network adapter 20 communicates with the other components of computing system, 12, via bus 18. It should be understood that although not shown, other hardware and/or software components could be used in conjunction with computing system 12. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 11. Computer system/server 12 of FIG. 11 can be practiced in distributed cloud computing environments where tasks are performed by remote processing devices that are linked through a communications network. In a distributed cloud computing environment, program modules may be located in both local and remote computer system storage media including memory storage devices. Computer system/server 12 is capable of being implemented and/or performing any of the functionality set forth hereinabove.

Figure 12:
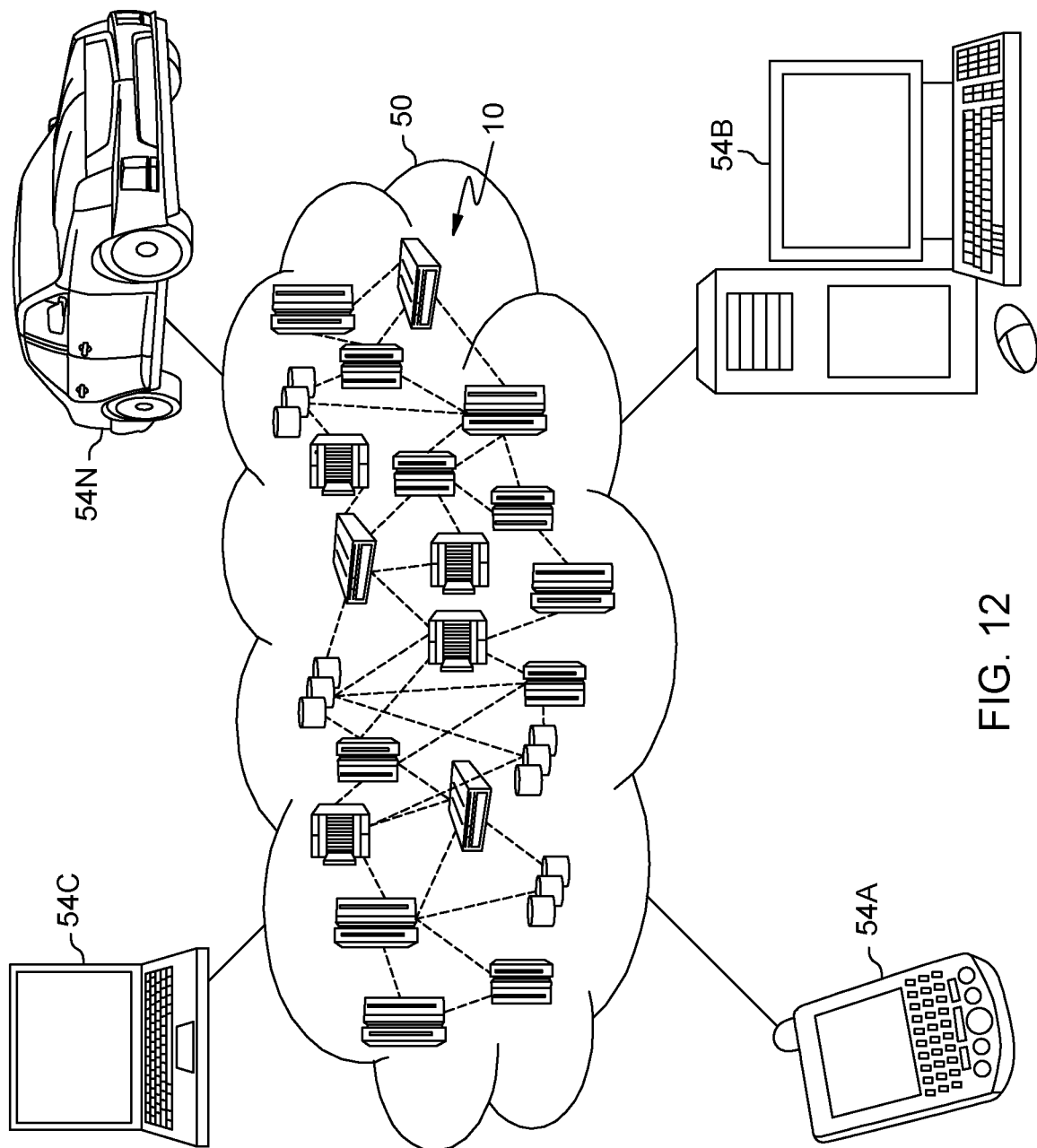
FIG. 12 depicts one embodiment of a cloud computing environment, in accordance with one or more aspects of the present invention.

Referring now to FIG. 12, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 13:
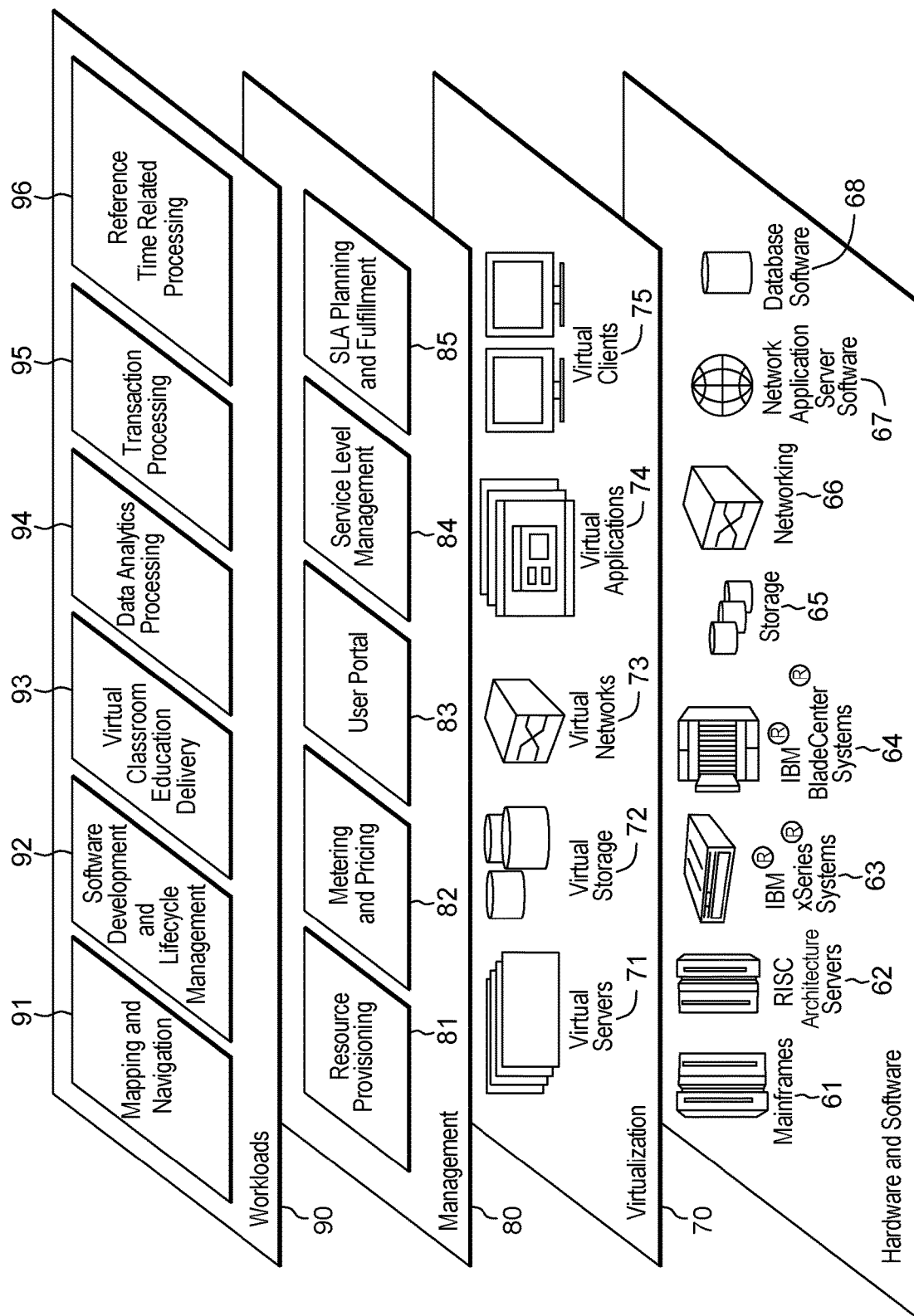
FIG. 13 depicts one example of abstraction model layers, in accordance with one or more aspects of the present invention.

Referring to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reference time-related processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product comprising:
   a computer-readable storage medium readable by one or more processors and storing instructions for execution by the one or more processors for performing a method comprising:
   receiving at a time server of a server time protocol (STP) facility of a coordinated timing network (CTN), a primary-reference-time (PRT) update, and a primary-reference-time (PRT) source identifier, the primary-reference-time update having been determined with reference to an external time source, the external time source comprising a precision-time-protocol (PTP) time source, and the PRT source identifier identifying the primary-reference-time source in use for the STP facility as the PTP time source;
   setting by the time server a primary-reference-time correction steering rate for the coordinated timing network based on receiving the primary-reference-time update; and
   broadcasting by the time server to one or more other servers of the coordinated timing network a PRT Correction Steering Information block (PCSIB), the PRT Correction Steering Information block including a precision time-protocol source identifier as the PRT source identifier for the time source used in determining the primary-reference-time update, and the primary-reference-time correction steering rate set by the time server.

2. The computer program product of claim 1, wherein the time source is one external time source of multiple external time sources supported for the server time protocol facility, and the coordinated timing network is an STP-only CTN.

3. The computer program product of claim 2, wherein another time source of the multiple external time sources includes a network timing protocol (NTP) time source.

4. The computer program product of claim 2, wherein the primary-reference-time (PRT) update is received in a command, the command being received at the time server from at least one of a hardware management console or a support element coupled to the coordinated timing network.

5. The computer program product of claim 2, wherein the primary-reference-time source identifier is one primary-reference-time source identifier of multiple selectable primary-reference-time source identifiers supported for the server time protocol (STP) facility and selectable based, in part, on the time source and configuration of the coordinated timing network.

6. The computer program product of claim 5, wherein the primary-reference-time source identifier is indicative of the primary-reference-time (PRT) update having been determined using the precision-time-protocol (PTP) time source.

7. The computer program product of claim 5, wherein the primary-reference-time source identifier is indicative of the primary-reference-time (PRT) update having been determined using the precision-time-protocol (PTP) time source, and being provided to the time server of the coordinating timing network via a secondary time server of the coordinated timing network.

8. The computer program product of claim 5, wherein the primary-reference-time (PRT) source identifier is indicative of the coordinated timing network further employing a pulse-per-second (PPS) source along with primary-reference-time update information obtained using the precision-time-protocol time source.

9. The computer program product of claim 5, wherein the primary-reference-time (PRT) source identifier is indicative of the coordinated timing network further employing a pulse-per-second (PPS) source along with primary-reference-time update information obtained using the precision-time-protocol time source, and being provided to the time server of the coordinated timing network via a secondary time server of the coordinated timing network.

10. The computer program product of claim 5, wherein the multiple selectable primary-reference-time source identifiers include:
a first identifier indicative of a primary-reference-time (PRT) update having been determined using the precision-time-protocol (PTP) time source;
a second identifier indicative of a primary-reference-time (PRT) update having been determined using the precision-time-protocol (PTP) time source, and being provided to the time server of the coordinated timing network via a secondary time server of the coordinated timing network;
a third identifier indicative of the coordinated timing network further employing a pulse-per-second (PPS) source along with primary-reference-time update information obtained using the precision-time-protocol (PTP) time source; and
a fourth identifier indicative of the coordinated timing network further employing a pulse-per-second (PPS) source along with primary-reference-time update information obtained using the precision-time-protocol (PTP) time source and being provided to the time server of the coordinated timing network via a secondary time server of the coordinated timing network.

11. The computer program product of claim 1, wherein the broadcasting includes broadcasting, by the time server, the primary-reference-time source identifier as part of the PRT Correction Steering Information block (PC SIB).

12. A system comprising:
a memory;
one or more processors in communication with the memory;
program instructions executable by the one or more processors via the memory to perform a method comprising:
receiving at a time server of a server time protocol (STP) facility of a coordinated timing network (CTN), a primary-reference-time (PRT) update, and a primary-reference-time (PRT) source identifier, the primary-reference-time update having been determined with reference to an external time source, the external time source comprising a precision-time-protocol (PTP) time source, and the PRT source identifier identifying the primary-reference-time source in use for the STP facility as the PTP time source;
setting by the time server a primary-reference-time correction steering rate for the coordinated timing network based on receiving the primary-reference-time update; and
broadcasting by the time server to one or more other servers of the coordinated timing network a PRT Correction Steering Information block (PCSIB), the PRT Correction Steering Information block including a precision time-protocol source identifier as the PRT source identifier for the time source used in determining the primary-reference-time update, and the primary-reference-time correction steering rate set by the time server.

13. The system of claim 12, wherein the time source is one external time source of multiple external time sources supported for the server time protocol facility, and the coordinated timing network is an STP-only CTN.

14. The system of claim 12, wherein the primary-reference-time source identifier is one primary-reference-time source identifier of multiple selectable primary-reference-time source identifiers supported for the server time protocol (STP) facility and selectable based, in part, on the time source and configuration of the coordinated timing network.

15. The system of claim 14, wherein the primary-reference-time source identifier is indicative of the primary-reference-time (PRT) update having been determined using the precision-time-protocol (PTP) time source.

16. The system of claim 14, wherein the primary-reference-time source identifier is indicative of the primary-reference-time (PRT) update having been determined using the precision-time-protocol (PTP) time source, and being provided to the time server of the coordinating timing network via a secondary time server of the coordinated timing network.

17. The system of claim 14, wherein the primary-reference-time (PRT) source identifier is indicative of the coordinated timing network further employing a pulse-per-second (PPS) source along with primary-reference-time update information obtained using the precision-time-protocol time source.

18. The system of claim 14, wherein the primary-reference-time (PRT) source identifier is indicative of the coordinated timing network further employing a pulse-per-second (PPS) source along with primary-reference-time update information obtained using the precision-time-protocol time source, and being provided to the time server of the coordinated timing network via a secondary time server of the coordinated timing network.

19. The system of claim 14, wherein the multiple selectable primary-reference-time source identifiers include:
   a first identifier indicative of a primary-reference-time (PRT) update having been determined using the precision-time-protocol (PTP) time source;
   a second identifier indicative of a primary-reference-time (PRT) update having been determined using the precision-time-protocol (PTP) time source, and being provided to the time server of the coordinated timing network via a secondary time server of the coordinated timing network;
   a third identifier indicative of the coordinated timing network further employing a pulse-per-second (PPS) source along with primary-reference-time update information obtained using the precision-time-protocol (PTP) time source; and
   a fourth identifier indicative of the coordinated timing network further employing a pulse-per-second (PPS) source along with primary-reference-time update information obtained using the precision-time-protocol (PTP) time source and being provided to the time server of the coordinated timing network via a secondary time server of the coordinated timing network.

20. A computer-implemented method comprising:
   receiving at a time server of a server time protocol (STP) facility of a coordinated timing network (CTN), a primary-reference-time (PRT) update, and a primary-reference-time (PRT) source identifier, the primary-reference-time update having been determined with reference to an external time source, the external time source comprising a precision-time-protocol (PTP) time source, and the PRT source identifier identifying the primary-reference-time source in use for the STP facility as the PTP time source;
   setting by the time server a primary-reference-time correction steering rate for the coordinated timing network based on receiving the primary-reference-time update; and
   broadcasting by the time server to one or more other servers of the coordinated timing network a PRT Correction Steering Information block (PCSIB), the PRT Correction Steering Information block including a precision time-protocol source identifier as the PRT source identifier for the time source used in determining the primary-reference-time update, and the primary-reference-time correction steering rate set by the time server.

* * * * *